Jan. 5, 1954   D. W. DUNIPACE ET AL   2,665,333
APPARATUS FOR MEASURING THICKNESS OF SHEET MATERIAL
Filed Nov. 30, 1950   3 Sheets-Sheet 1

Inventors
Donald W. Dunipace
and Norman C. Nitschke
By Nobbe & Swope
Attorneys

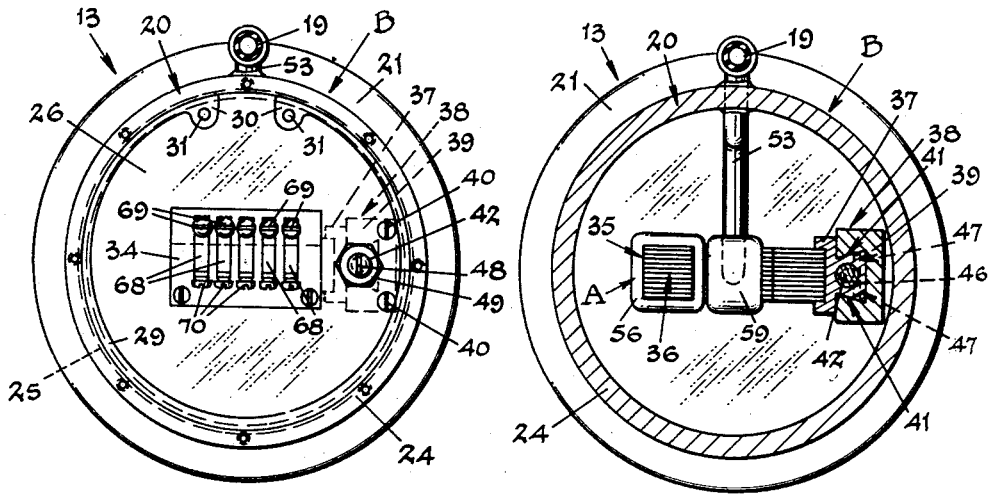
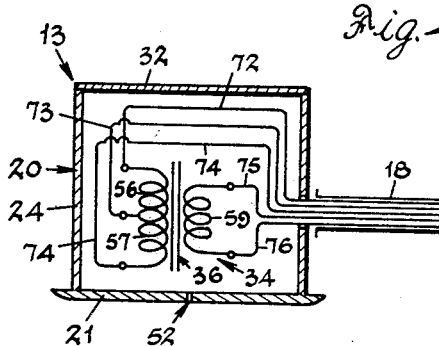
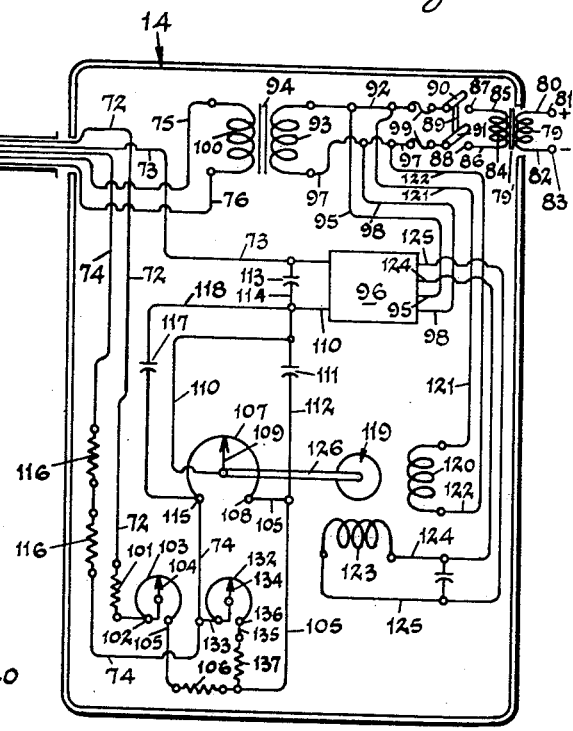

Patented Jan. 5, 1954

2,665,333

UNITED STATES PATENT OFFICE 2,665,333

APPARATUS FOR MEASURING THICKNESS OF SHEET MATERIAL

Donald W. Dunipace and Norman C. Nitschke, Perrysburg, Ohio, assignors to Libbey-Owens-Ford Glass Company, Toledo, Ohio, a corporation of Ohio Application November 30, 1950, Serial No. 198,412

15 Claims. (Cl. 324—34)

The present invention relates broadly to improvements in inspection apparatus.

More particularly, the invention has to do with a novel gaging apparatus to continuously inspect and record the thickness or variation in thickness of sheet material which can only be contacted on one of its surfaces.

Heretofore, it has been customary practice in the finishing of sheet material, such as for example plate glass, to periodically remove specimen samples from various areas and inspect the same by means of conventional thickness measuring instruments. This is perhaps but one of several practices attempted in an endeavor to afford a periodic check of the sheet material while still in a partially finished condition. Obviously, when a selected sample has been examined, the remainder of the sheet from which the sample was taken may have passed beyond any point at which its finishing could have been varied in one way or another to better its quality, or control the thickness thereof. This example and like methods of inspection have been employed during the grinding and polishing of plate glass and while the sheets are secured in plaster upon the tops of a line of work tables moving continuously beneath a series of grinding and polishing elements. Those acquainted with this phase of plate glass manufacture will readily appreciate the difficulties heretofore experienced in attempting to obtain the glass thickness since only the upper surface thereof is exposed to examination, the bottom surface being embedded in a layer of plaster of Paris or the like which secures the sheet in its entirety to the upper surface or deck of the work table.

Various practical objections have entered into the possible solution of this problem, since any surface contacting the glass is susceptible to wear, mechanical friction and/or vibration either of the tables or from the grinding and polishing elements. Now, however, it has been discovered that by the use of a novel free hydraulic support, a gaging device may be disposed in such physical contact to the surface of a glass sheet that the thickness thereof can be accurately determined to very close dimension and an effective continual control exerted by the operator, enabling him either to make immediate adjustments in the grinding and polishing operations or to follow definite areas of glass on the grinding tables to the completion of their polishing.

It is therefore an aim of this invention to provide an improved inspection apparatus for accurately measuring, and recording if desired, the thickness of a glass sheet while it is secured to a supporting surface and moving therewith so that only its upper surface can be contacted.

Another object of the invention is to provide an inspection apparatus of the above character which embodies magnetically operated means mounted above a moving sheet of glass at a predeterminable distance therefrom in order that a magnetic field can be created with reference to the top of the work table on which the glass is carried.

Another object of the invention is to provide an inspection apparatus of the above character which includes a magnetic instrumentality and a supporting case therefor, said supporting case being carried in riding contact with the surface of a glass sheet by an interposed fluid film of predetermined thickness whereby the magnetic instrumentality will be supported above the top of a grinding table and the character of the magnetic field created therebetween be made rapidly responsive according to the thickness of the glass sheet then passing beneath said case.

A further object of the invention is to provide in an inspection apparatus of the above character, a magnetic device including a supporting case therefor, and means for hydraulically supporting the case upon the surface of a glass sheet, said case and magnetic device being adjustably movable with respect to one another to permit primary location of said magnetic device in vertical relation to the under face of the case according to the prescribed thickness of glass sheets to be inspected.

A further object of the invention is to provide in an inspection apparatus of the above character, a magnetic instrumentality which embodies magnetically operated means mounted above a moving sheet of glass at a predeterminable distance and a magnetic reference plate disposed at a predeterminable distance beneath said moving sheet of glass whereby a magnetic field can be created with reference to the top of the said reference plate and the character of said magnetic field be made rapidly responsive to the thickness of the glass sheet then passing through said magnetic field.

A further object of the invention is to provide in an inspection apparatus of the above character, a magnetic device including a supporting case therefor, and means for hydraulically supporting the case upon the surface of a glass sheet, in combination with a magnetic plate disposed beneath said glass sheet with means for hydraulically sustaining the magnetic plate at a predetermined distance from the undersurface of the glass, the magnetic device being adapted to create a magnetic field with reference to the magnetic plate whereby the thickness of a glass sheet may be obtained according to the electrical responses produced between said magnetic device and said plate by variations of the thickness of the glass passing therebetween.

A still further object of the invention is to provide a gaging head and a magnetic device carried therein, and means for supporting the gaging head by means of a liquid film on a moving sheet of glass, in combination with a recording and indicating system whereby the magnetic device will produce electrical responses within said system to record and/or continuously indicate the thickness of the moving sheet of glass.

A still further object of the invention is to provide a gaging head and a magnetic device carried therein and a reference plate adapted to complete a magnetic field created by said device, means for supporting the gaging head and the reference plate by means of fluid films in spaced relation to a moving sheet of glass in combination with a recording and indicating system whereby the magnetic device will produce electrical responses within said system to record and/or continuously indicate the thickness of the moving sheet of glass.

Other objects and advantages of the invention will become more apparent during the course of the following description when taken in connection with the accompanying drawings.

In the drawings, wherein like numerals are employed to designate like parts throughout the same:

Fig. 4 is a top view of the gaging head with the cover removed;

Fig. 5 is a horizontal sectional view of the gaging head taken substantially on line 5—5 of Fig. 3;

Fig. 6 is a front elevation of a recording and indicating device which may be used with the gaging head;

Fig. 7 is a diagrammatic view of an electrical system in which the gaging head is the monitoring element;

Briefly stated, this invention is concerned with the provision of a magnetic thickness gaging instrument which is sustained at a predetermined height above the surface of the glass sheet or other material to be gaged. In the development of the invention it was found that if a magnetic instrument were to be carried by a suitable supporting case or container, the case could be supported upon a film of fluid, such as water, and maintained at a definite height by appropriate limitation of the fluid pressure. Since the water or other fluid film is substantially constant, the container will be elevated or lowered relative to a known height or plane according to variations in the thickness of the glass or other material, while at the same time no friction will be created and no vibration above a minimum transmitted to the container and the magnetic instrument therein. Now, if the thickness of the water film is established as well as the thickness of the layer of the embedding plaster for the glass sheet, their summation, when taken from the actual distance between the lower surface of the supporting case and the upper surface or top of the work table, will determine the thickness of the glass By creating a magnetic field of calculated strength between the magnetic instrument and the work table, any differential of thickness will vary the reluctance of the magnetic force lines and consequently produce a reaction, which is recorded, in an electrical system of which the magnetic instrument is a monitoring part.

Figures 1, 2, 3, 8:
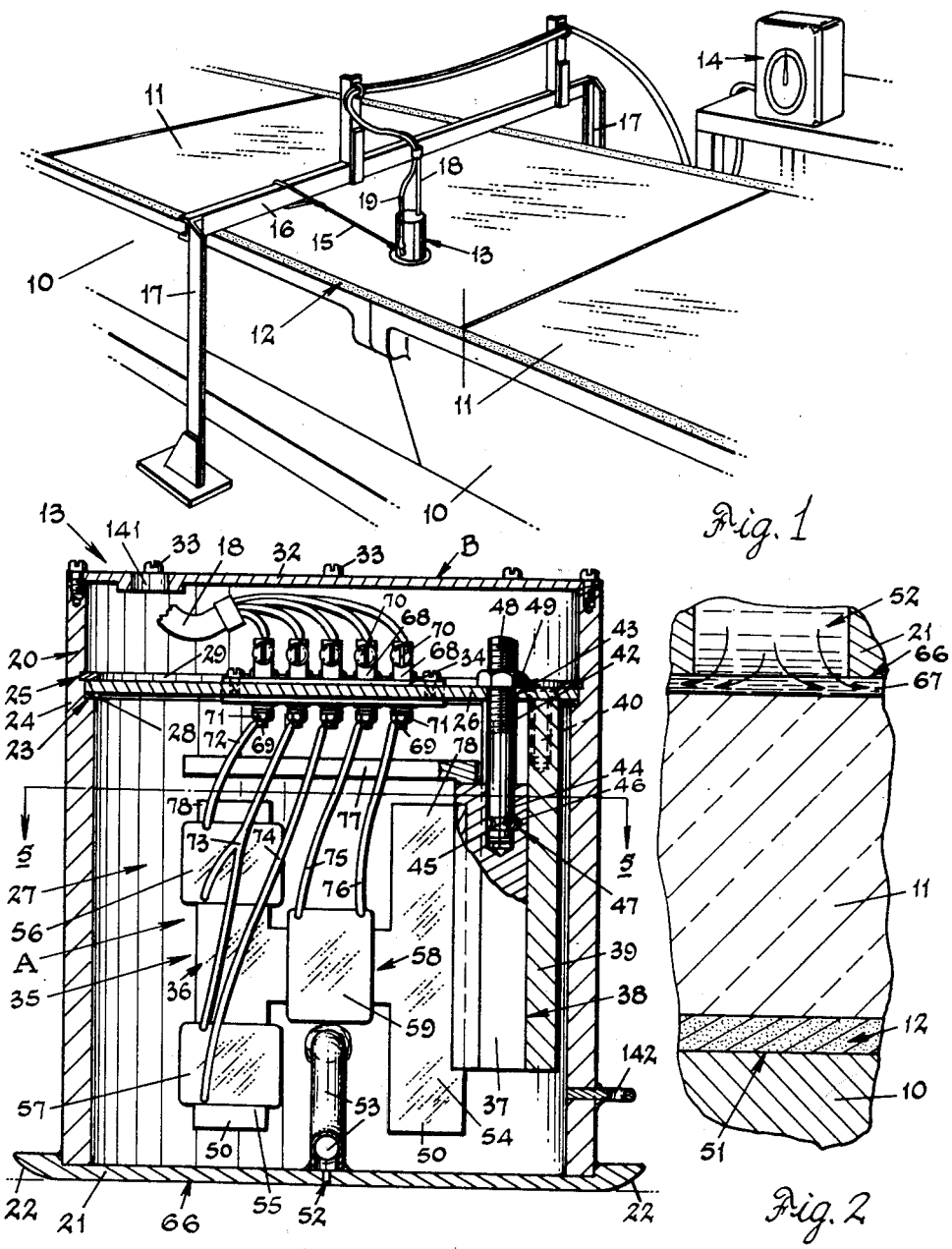
Fig. 1 is a perspective view of inspection apparatus constructed in accordance with the invention and mounted upon a sheet of glass being ground and polished.
Fig. 2 is an enlarged sectional detail view of the lower surface of the gaging head of the inspection apparatus, the glass and the glass supporting table.
Fig. 3 is a vertical detail section through the gaging head.
Fig. 8 is a cross-sectional view of a checking plate for the gaging head.

Referring now to the drawings and particularly to Fig. 1, there is disclosed a portion of the well known continuous system for grinding and polishing plate glass and including a series of work tables 10 having secured upon the top thereof glass sheets 11 by means of a layer of plaster of Paris or the like indicated at 12. The glass sheets 11 are embedded in the layer of plaster in one area, or "laying yard" of the continuous grinding and polishing system and are thence carried first beneath grinding heads and, subsequently, beneath polishing runners until the upper surface thereof is finished and the sheets are removed at the completion of the operation in the "stripping yard." During this continual process, there has previously been no entirely satisfactory method devised wherein the thickness of the glass could be instantly, or preferably continuously, checked. As illustrated in Fig. 1, no working tools have been shown since it will be made quite apparent that the inspection apparatus herein provided can be located with equal advantage between the individual grinding and/or polishing tools or at various other points of the operation.

The inspection apparatus of this invention comprises a gaging head, generally indicated by the numeral 13 in Fig. 1, and a suitable indicating device indicated at 14. The gaging head 13 is attached by a flexible cable 15 to a framework 16 that is supported by standards 17 from the floor and bridges the work tables 10. The connection of the cable 15 is such that it merely restrains the head 13 from traveling with the glass but otherwise imposes no restriction upon freedom of movement of said head either in a vertical direction or laterally with respect to the glass surface. Two flexible conduits extend from the gaging head 13; one, such as the conduit 18, carries the service lines from the source of electrical energy and to the indicating device 14 while the second is employed as a water supply conduit 19. According to the invention, the gaging head 13 is supported on a film of fluid, such as water, or like mediums, supplied by the conduit 19, on the surface of the glass sheets 11 and literally floats thereon, rising and falling with any variation of glass thickness as freely permitted by the flexibility of the cable 15. During movement of the glass progressively beneath the head 13, variations are reproduced and amplified through the medium of the service conduit 18 and within the indicating device 14 as will be more fully hereinafter described.

The gaging head 13 embodies generally a magnetic instrumentality or device A housed in a supporting case B. The case B comprises a tubular body 20 which is closed at the bottom by a plate 21 that is welded or otherwise sealingly secured to the lower peripheral edge of the tubular body in a water-tight manner. The plate 21 is substantially larger in diameter than the body 20 in order that the lower annular edge thereof may be beveled or suitably rounded, as at 22, so that the plate will ride freely over minor obstructions which are encountered particularly when the following edge of one sheet and the leading edge of a second sheet pass beneath the head 13. Preferably the plate is of a non-magnetic or electrical conducting metal such as stainless steel or brass.

At a point substantially below the upper rim of the body 20, a shoulder 23 is formed on the inner wall of the said body by reducing the thickness of the wall 24. Slightly above the shoulder 23, an annular groove 25 is provided in the upper, thinner section of the wall 24. A circular plate 26 is arranged and supported on the shoulder 23 and to seal the lower area, or chamber 27 of the head 13 from moisture, a gasket 28 may be placed on the shoulder before the plate 26 is located thereon. The plate is fixedly secured in its supported position by means of an annular expansion ring 29 located in the groove 25. This ring is a conventional type of locking device which has an open section defined by two ends or spaced heads 30 in which are located openings 31 by which the heads 30 may be urged toward each other by a suitable tool and the ring compressed sufficiently for its retraction from the groove 25. Upon release of the heads 30, the characteristic expansion of the ring spreads the same to its natural circular form and retains it in the groove 25 provided for its function of locking. The body 20 is closed by a cover or lid 32 that is secured on the upper edge of the body by means of suitable screws 33 or the like.

The plate 26, on the shoulder 23, serves as the base for supporting the magnetic device A and also a terminal plate 34 by which one end of the flexible conduit 18 is connected to said device. More particularly, the magnetic device A includes a transformer 35 which is suspended from the plate 26 in such a manner as to permit its vertical adjustment within the tubular body 20 and especially with reference to the bottom plate 21. For this purpose, the transformer 35 is provided with a substantially H-shaped, laminated core 36 that is adapted to be carried in a generally vertical position by one, or the movable member 37 of a dovetail construction 38. The opposite or stationary member 39 of the dovetail construction 38 is secured by screws 40 to the under surface of the plate 26 and serves to guide the member 37 in vertically directed movements. The member 37 is caused to slide with reference to the dovetail surfaces 41 (Fig. 5) of the stationary member 39 by means of a threaded shaft 42 which is supported by the threads thereof in a tapped opening 43 in the plate 26. The lower portion of the shaft 42 is received in a bore 44 in the member 37 and adjacent the lower end thereof is provided with an annular groove 45 in which a pin 46 is tangentially arranged. The ends of the pin 46 are carried in a transverse bore 47 formed in the member 37 to position the central portion thereof within the groove 45 to retain the shaft 42 from endwise movement while permitting free rotation of the same.

The shaft 42 is provided with a driving slot 48 in its upper end and a lock nut 49 is threadedly located on the shaft to secure the same in any adjusted position to which it may be turned. The shaft is threaded in the same manner as the shaft of the conventional micrometer; that is to say, having forty threads per inch. By selecting this number of threads, one complete revolution of the shaft will obtain a rise or descent of the magnetic device A equal to twenty-five thousandths of an inch. The lower ends 50 of the laminated core 36 may thus be located at any suitable, approximated elevation above the upper surface of the plate 21, or, when the gaging head 13 is operatively located on the surface of the glass, from the top 51 of the work table 10.

The gaging head 13, as previously set forth, is carried on the surface of the glass sheet 11 by means of a fluid film, such as water, and as supplied through the flexible conduit 19. For this purpose, the bottom plate 21 is provided with a relatively small, centrally disposed orifice 52. The orifice in the plate communicates with the conduit 19, connected externally of the head, through a pipe 53 that is secured at one end to the plate, as by welding, in enclosing relation to the upper end of said orifice. Preferably, the pipe 53 is suitably bent to extend across the surface of the plate and rise along the wall of the tubular body 20 to a point at which it passes through said wall and is connected at its outer end to the conduit. The fluid under pressure may thus be conveyed from a suitable metering and/or regulating valve through the conduit 19 and pipe 53 to the orifice 52 in the plate 21 and flow therefrom at a pressure which will create a film having sufficient pressure to support the gaging head 13 on and above the surface of the glass sheet 11. Since the pressure of the water may be maintained within suitable limits, the film of fluid created thereby will not vary despite the vertical movement of the gaging head in response to changing thickness of the glass.

In connection with the above described water film, it is to be noted that its constant formation creates a resultant emanation or escape of the water from beneath the gaging head 13. This acts to produce ripple-like movements or a continual series of circularly and outwardly expanding waves. These waves, particularly across the leading area of the plate 21 of the gaging head, produce a consequent flushing action which dispels any particles of glass or grinding abrasive from the surface of the glass approaching the head. Introduction of foreign particles into the supporting water film is thus prevented and obviously the gaging head will not be inadvertently raised from its established position with reference to the surface of the glass.

The laminated core 36, carried by the slidably mounted member 37, is preferably of an H-shaped formation. One vertically disposed leg 54 is fixedly secured to the member 37 while the opposed vertical leg 55 carries the coils 56 and 57, one above and one below the horizontal web 58. A third coil 59 is mounted on the web 58. The coils 56 and 57 may be described as "search" coils, while the coil 59 acts as the power or "exciter" coil. The coils may be connected in a suitable electronic circuit, which will respond to fluctuations in and between the coils 56 and 57 to produce the actuation of an indicating device such as is shown in Fig. 6, and previously designated by the numeral 14.

This device is contained within a suitable case or cabinet 60 and has arranged in the face thereof a dial 61 and pointer 62. According to this invention, the dial 61 is divided into fifty increments of measurement 63 and 64 on either side of a zero point indicated at 65 and the pointer 62, when moved in a clockwise or counter-clockwise manner, serves to denote any increase or decrease from the zero point or a given standard as indicated by the positioning of the pointer at this midpoint of the dial. Thus, for the purpose intended, the zero point 65 may be assumed to be the average or standard thickness of a sheet of glass and movement of the pointer therefrom in either direction assumed or taken as a decreased thickness or an increased thickness. When the pointer 62 rotates clockwise, the thickness of a sheet in one area may thus be increasing above the standard and, when it rotates in a counter-clockwise direction, the sheet is diminishing in thickness and running below the standard. For example, during finishing of the first surface of a glass sheet intended for what may be classified as one-quarter inch plate, the average standard at one point of the operation might be set at two hundred and ninety thousandths of an inch, whereas during the finishing of the second surface, the standard might be two hundred and fifty thousandths of an inch.

Referring now to the enlarged sectional view in Fig. 2, the relative thicknesses of the plaster layer, the glass sheet and water film are indicated between the top 51 of the work table 10 and the under surface 66 of the plate 21 of the gaging head 13. Now, it has been established that the plaster of Paris layer 12 averages approximately seven thousandths of an inch while the film of water, indicated at 67, maintains, at pressures between 10 and 30 pounds, a thickness of substantially five thousandths. This pressure is supplied through the orifice 52 in the plate 21 by the pipe 53 and conduit 19. It is to be noted that the thicknesses herein stated are not to be taken as absolute but to be accepted as reasonably accurate calculations made under certain operating conditions and within tolerances of from two to four thousandths of an inch variance.

The coils 56, 57 and 59 of the magnetic device or transformer 35 are connected by wires, grouped within the conduit 18, with an electrical system contained within the indicating device 14. More particularly, these connections are made in a manner which protects the moisture-tight condition of the chamber 27 of the gaging head 13. The terminal plate 34 thus carries a plurality of L-shaped conductor bars 68 on its upper surface. The conductor bars have binding posts 69 at one end thereof, said posts being anchored in the plate 34 and extending downwardly from its under surface. The conductor bars 68 are provided with screws 70 for securing wire connections from the conduit 18 above the plate 34 while nuts 71 are threaded onto the lower ends of the binding posts 69 to secure the ends of connections from the transformer. Thus a wire 72 from one side of the coil 56 is connected through the first bar 68; the joint wire 73 from the opposite side of the coil 56 and one side of the coil 57 through the second bar 68, the wire 74 from the opposite side of the coil 57 through the third bar 68 and the wires 75 and 76 from the coil 59 through the fourth and fifth bars 68 respectively.

The coil 59 is arranged between the coils 56 and 57 to create a flow of electrical energy in approximately balanced relation circuitously through each of said coils and the legs 54 and 55 of the core 36. To produce a completed, balanced magnetic field through the coil 56, a reference plate 77 is secured at one end to the sliding member 37 of the dovetailed construction 38 in spaced relation to the upper ends 78 of the core, and the distance between these ends 78 and the plate 77 is maintained despite the distance, set as a working standard between the lower ends 50 of the core 36 and the top 51 of the tables 10. The space between the ends 50 and the deck thus determines the strength of the completed magnetic field through the coils 57 and 59, the core 36 and the table top. This space includes the thicknesses of the water film and layer of plaster, which, as above stated, may be reasonably computed within close tolerances, leaving the thickness of the glass sheet as the only variable dimension and the one that can increase or decrease the space established between the ends 50 of the core 36 and the top 51 of the work table 10.

Generally stated the electrical system of this invention embodies a bridge circuit wherein the coils 56 and 57 are jointly connected to one side of the input of an amplifier. Since the difference between the magnetic fields of the coils 56 and 57 will be reflected in the conditions within said bridge circuit and the operation of the amplifier, and further since the fundamental reason for this difference (the distance between the coil 57 and the top 51 of the work table) cannot be entirely dissipated, a variable resistance is connected in series with this coil so that a balance within the bridge circuit can be approached when the strength of the variable resistance is modified until the circuit through the amplifier will produce a balance within the bridge circuit. For this purpose, the amplifying device causes the operation of a compensating motor which operatively alters the strength of the variable resistance connected in series with the coil 57. The coils are fundamentally arranged so that the magnetic field of one (coil 56) passes through the substantially fixed reference plate 77 while the field of the other (coil 57) is influenced by the space existing between the respective coil 57 and the top of the work tables. When a computed balance has been established in the bridge circuit of these coils, any variation of glass thickness alters the physical distance between the coil 57 and table top 51 and produces a consequent differential of balance in the input side of the amplifier which is reflected throughout the system and sets the same into operation until a balance in the bridge circuit can be reestablished. This correction is mechanically interpreted by means of the dial 61 and pointer 62 so that the extent of unbalance created by the coils 56 and 57 can be translated into an exact measurement of the change in glass thickness.

The system also includes means whereby the bridge circuit can be balanced according to initial existent conditions in order that the pointer 62 will be accurately positioned with reference to the zero indication 65 on the dial 61. Further means are included to increase or decrease the current flow in that side of the bridge circuit, which includes the coil 57 and the variable resistance, to compensate for inequalities therein so that the reading on the dial will be substantially equal to and denote the change in the thickness of the glass sheet.

Referring now more specifically to the operation of the coils 56 and 57, there is disclosed in Fig. 7 an electrical system, in which the gaging head 13 is the monitoring part, is illustrated as being representative of electrical systems which may be used therewith. As herein provided, a source of electrical energy is supplied to the primary 79 of an isolating transformer 79' through line 80 from the side 81 of an electrical source of supply and line 82 to the side 83 of the said electrical source. The secondary 84 of the transformer 79' is connected by the lines 85 and 86 to opposite, fixed contacts 87 and 88 of a control switch 89 having movable contacts 90 and 91. Upon closure of the contacts 87 and 90, a circuit through the line 92 is completed to one side of the primary 93 of a reducing or "step-down" transformer 94 and by a branch line 95 to the supply side of an amplifier 96. Simultaneously, the contacts 88 and 91 complete a return to the line 86 from the primary 93 by line 97 and a return branch line 98 from the supply side of the amplifier. Preferably fuses 99 are located in the lines 92 and 97 as shown.

The secondary 100 of the reducing transformer 94 is connected by the lines 75 and 76 to the primary, or coil 59 of the transformer 35. The coils 56 and 57 thus constitute the secondary of said transformer and their related responsiveness to one another influences the circuit conditions within the input side of the amplifier 96. The wire 73 is connected in common to each of said coils 56 and 57 and completes the circuit to one input side of the amplifier.

The opposite side of coil 56, forming one side of the bridge circuit, is connected by line 72 through limiting resistance 101 to the fixed contact 102 of a variable resistance 103 and from the adjusting arm 104 of said resistance by line 105, including a limiting resistance 106, to one side of a variable resistance 107, as at 108. The adjusting arm 109 of the variable resistance 107 completes the circuit from the coil 56 to the amplifier 96 by line 110. If desired, to stabilize the current flow and minimize noise and surges of undesired frequency, a condenser 111 may be located in bridge line 112 between the lines 105 and 110 and a condenser 113 may be similarly interposed between the lines 73 and 110, in branch line 114.

The line 74 from the opposite side of the coil 57 is connected to the fixed contact 115 of the variable resistance 107, the circuit including current limiting resistances 116 in line 74 to the contact 115 of the resistance and condenser 117 in line 118 from the fixed contact 115 of the resistance 107 to line 110.

A balanced condition can thus be obtained in the bridge circuit of the coils 56 and 57 according to the magnitude of the resistance 107 since the side of said circuit through lines 74 and 110 from the coil 57 to the amplifier 96 may be thereby made to balance with the side of said circuit through lines 72 and 105 from the coil 56 by means of a motor 119 which is operatively associated with the adjusting arm 109 of resistance 107. The main field winding 120 of this motor is connected to the main lines 92 and 97 by lines 121 and 122 while the circuit of the secondary or balancing winding 123 of said motor is completed by the lines 124 and 125 to the output side of the amplifier 96. The shaft 126 of the motor 119 carries the adjusting arm 109 of the resistance 107 and when conditions within the system vary the balance between the windings 120 and 123, the motor will be activated to rotate the arm 109 until the unbalanced condition existent in the bridge circuit of the coil 56 and the coil 57 is corrected by adjustment of the variable resistance 107.

The magnetic field of the coil 56 is substantially constant being through the coils 56 and 59, the core 36 and reference plate 77; however, as previously set forth, the magnetic field of the coil 57 is determined by the distance existent between the top 51 of the work table 10 and the core 36. Thus, any change in glass thickness will be indicated by a variance in the length of magnetic path of the field of the coil 57 and a consequent unbalance between the windings 120 and 123 of the motor 119 as reflected by the amplifier 96. This variance will cause the motor 119 to operate and, by the shaft 126 thereof, swing the adjusting arm 109 until the potential through line 110 and the resistance 107 equalizes the extent of unbalance existing between the sides of the bridge circuit and as determined by the coil 56 and the coil 57 through line 73. To visually observe the amplitude of unbalance, the pointer 62 is also carried by the shaft 126 in order that the extent of this unbalance in the system may be computed and translated mathematically so that the reading on the dial 61 will actually represent, in thousandths of an inch, the increase or decrease of glass thickness from the established standard of thickness.

The variable resistance 103 in the circuit of the coil 56 and between the lines 72 and 105 thereof is employed to remedy initial out-of-balance conditions in said bridge circuit which are indicated visually on the dial 61. One example of its use occurs when the inspection apparatus is placed in operation and the magnetic device A is primarily positioned within the gaging head 13 according to the thickness of glass to be checked. When this thickness is an approximated standard for one-eighth inch glass, the ends 50 of the core 36 will be disposed in closer relation to bottom plate 21 than for one-quarter inch glass. Likewise when three-eighths glass is to be inspected, the core will be moved further from the plate than for one-quarter inch glass. Obviously, the dimentional differences herein stated are in the order of one hundred and twenty-five thousandths and will greatly exceed the range of the numbered scales on the dial 61. Accordingly, the threaded shaft 42 is now turned to raise or lower the transformer 35 until it is suitably located to operate within a small differential of measurement of the estimated standard of thickness.

Preferably, the gaging head 13 is now placed upon a glass plate of the desired thickness which is carried on a metal base, and a water film created beneath the lower surface of the head. When the switch 89 is closed, the coils 56, 57 and 59 will become activated and since the distance between the upper ends 78 of the core 36 with respect to the reference plate 77 is maintained despite movement or adjustment of the lower ends 50 to an estimated distance from the table top 51, an initial unbalance in the bridge circuit will be created between the coils 56 and 57 and denoted on the dial 61 by reason of the fact that while the gaging head 13 is on a glass plate of standard thickness, the magnetic field of the coil 57 will be through said coil, the coil 59, the core 36 and the metal base of the standard plate.

The side of the bridge circuit through the coil 56 may now be out-of-balance with that side of said circuit through coil 57 and this condition indicated visually by the position of the pointer 62 with reference to the dial 61. By varying the magnitude of the variable resistance 103, the voltage in the lines 72 and 105 will be increased or decreased and the amplifier 96 caused to operate the motor 119 until the adjustment of the variable resistance 107 will balance each side of the system at which time the pointer 62 will be directed to the zero indication 65 on the dial 61. As shown in Fig. 6, the knob 127 may be employed to manually rotate the adjusting arm 104 of resistance 103.

To check the function of the electrical system, the gaging head 13 may be located on a series of glass plates 128, 129 and 130 secured to a metal base plate 131 such as are shown in Fig. 8. The plate 129 of an estimated standard thickness is preferably located centrally on the metal plate 131 with the glass plates 128 and 130 on either side thereof. The plates 128 and 130 may, for example, have thicknesses of twenty thousandths of an inch below and above the standard thickness and the gaging head 13 moved from one plate to another to check the accuracy and responsiveness of the electrical system to the changes in glass thickness.

In the event that the balance in the bridge circuit and between the coils 56 and 57 is properly equalized through the resistances 103 and 107 and the pointer 62 is accordingly located at the zero indication 65, there may still exist a discrepancy in the magnitude of the current through the variable resistance 107 so that, with a given difference of thickness, such as an increase of twenty thousandths of an inch from the standard, the power output through amplifier 96 to the secondary winding 123 of the motor 119 may not be sufficient in balancing the bridge circuit through the coils 56 and 57 by motor operation of the arm 109 of resistance 107, to move said arm, thereby balancing the circuit through said coils, a sufficient radial distance to cause the pointer 62 to swing from the zero indication 65 and in the desired direction until it arrives at a legend 20 on the dial 61. This condition will indicate that the current flow through the variable resistance 107 is of too great a magnitude to correlate the action of the resistance to the desired range of motion to be imparted to the pointer.

To provide compensation for this further correction to the system, a variable resistance is placed in parallel with the variable resistance 107 so that a control may be imposed on the magnitude of the current through said resistance so that it may be desirably increased or decreased. Referring again to the diagram in Fig. 7, there is shown a variable resistance 132 that is connected by the line 133 to the line 74 from the coil 57 to the adusting arm 134 thereof and by line 135 from the fixed contact 136, through the limiting resistance 137 to the line 105. Now when the required voltage must be sufficient to move the pointer 62 to the legend 20 and the existent current conditions in the resistance 107 will only cause a balance within the bridge circuit which will visually produce a movement of the pointer 62 to, for example, fifteen increments on the scale, the adjusting arm 134 is manually shifted on the resistance 132 until the magnitude of the current through the resistance 107 is decreased sufficiently to further move the pointer until it reaches the legend 20. The adjusting arm 134 of the resistance 132 may be manually actuated by means of the knob 138 located adjacent the knob 127 on the face of the cabinet 60 of the indicating device 14.

The gaging head is now suitably corrected for operation in a glass grinding and polishing line and may be used with equal advantage to inspect the glass thickness between any of the several grinding heads thereof, in the "middle yard" between the grinding heads and the polishing tools or in the polishing area between these tools. Since the gaging head is supported by the film of water 67 in a substantially frictionless manner above the surface of the glass, it rides thereon and instantly responds to any variance in thickness. This variance, as heretofore set forth, produces a change in balance within the bridge circuit of the coils 56 and 57 and, through the amplifier 96, causes operation of the motor 119 until it has shifted the arm 109 of the variable resistance 107 sufficiently to balance the voltage of the said circuit which correction is simultaneously indicated by the change of position of the pointer 62 with respect to the numbered increments 63 or 64 on the dial 61. If desired, the shaft 126 may also be provided with a conventional actuating device for a pen, indicated at 139 in Fig. 6, so that a continuous record may be made of the glass thickness on a recording graph sheet 140 which is carried on a suitable support and rotated in the usual manner of recording devices by a clock motor.

For operation of the gaging head 13, the cover 32 is removed from the upper rim of the tubular body 20 and the ends of the wires 72 to 76, inclusive, grouped within the conduit 18, are inserted through an opening 141 in the cover. The wires are now connected by the screws 70 to the conductor bars 69 in their related order after which the cover 32 is replaced and secured by screws 33. The head is now attached by an eye 142 secured in the wall 24 to the flexible cable 15 which is connected at its opposite end to the frame 16, bridging the line of work tables 10, or may optionally be connected to other fixed members of the equipment.

When the gaging head is ready for placement on the glass sheets 11 carried by the tables 10, the flow of water through the conduit 19 is created so that when the head is placed upon the glass surface, the stream emanating from the orifice 52 will immediately form the film 67 between the lower surface 66 of the plate 21, or head 13 generally, and the upper surface of the glass. Since there is no physical restriction imposed upon the head other than to prevent its movement with the glass sheet, the head actually floats on the said surface and the delicacy of its gaging inspection depends only upon the vertical rise or descent as produced by thickness variations of the glass which is immediately passing beneath the bottom surface 66 thereof.

Since there will be no appreciable wear produced on the bottom surface 66, the gaging head may remain unattended for long intervals of time and until removed to another area for inspection or to check the accuracy thereof by means of a plate 131 which check is made periodically. During the movement of the glass sheets therebeneath, an increase in thickness will elevate the gaging head from its computed height above the top 51 of the work table and consequently lengthen the path of the magnetic field of the coil 57 between the said table top and the lower ends 50 of the transformer 35. This produces a variation in the balance effected in the bridge circuit between the coils 56 and 57, the field of coil 56 being substantially constant between the upper ends 78 of the transformer and the reference plate 77. Now this change or decreasing of the field of the coil 57 will be transmitted by the line 74, through any currently adjusted setting of the variable resistance 107, to the line 110 and one input side of the amplifier 96. Since the common line 73 of the coils is connected to the opposite input side of said amplifier, the lines 124 and 125 from the output side thereof will change the character of the current through the secondary winding 123 of the motor 119 and consequently produce a differential between the winding 123 and the main winding 120 which is connected by lines 121 and 122 to the main electrical supply lines 92 and 97.

The motor 119 will thus be caused to rotate the shaft 126 in a clockwise direction so as to bring the potential through the adjusting arm 109 of the variable resistance 107 and line 110 equal to the potential of line 73 to the input sides of the amplifier 96, thereby balancing the bridge circuit of lines 74 and 72 and 105 to line 110. Simultaneously the shaft 126 will carry the pointer 62 in a clockwise direction with reference to the measured increments 64 of the dial 61. Since the spacing between these increments is calibrated to linearly express the extent of correction required in the electrical system, the physical means for lengthening the path of the magnetic field of the coil 57 or, more specifically, the increased thickness of the glass sheet, will be directly readable by the position of the pointer 62 in relation to the increments on the dial. For example, if the standard thickness for the first surfacing of a glass sheet should be set at two hundred and ninty thousandths of an inch, where the thickness in one area approaches three hundred thousandths of an inch, this increase will produce the resultant electrical reaction within the system to activate the motor 119 until the arm 109 of the variable resistance 107 makes the necessary correction and by so doing similarly carries the pointer 62 into registration with the legend 10 in the increments of measurement 64. Conversely, where the grinders are removing too much glass from the surface of the sheet, the transformer 35 of a gaging head 13 in this area will create a chain of functions which will cause the pointer 62 to swing counter-clockwise until the extent of glass removal, below the standard required, is denoted by the pointer's position in relation to the increments 63 on the dial. Since even the difference of surface levels occurring between the adjoining ends of two sheets will be instantly denoted by rapid rotation of the pointer in one direction or the other, a continual record graph can be studied and the thickness of any particular sheet readily determined.

Now, if the thickness of glass is reduced, as for example, from a standard of two hundred and ninety thousandths of an inch, for the first surface of one-quarter inch glass plate to one hundred and seventy thousandths of an inch for the first surface of one-eighth inch glass plate, the indicating device will not be able to adequately function since the difference is too great for the permitted range of the instrument. Accordingly, the gaging head 13 is removed from its operating area and the cover 32 is removed therefrom. The nut 49 on the shaft 42 is loosened and said shaft is turned to lower the transformer 35 until the lower ends 50 thereof are suitably spaced in approximate distance from the top of the work table. This, of course, is determined by placing the gaging head on the desired checking plate 131 and observing the position of the pointer 62 relative to the dial 61.

However, since the difference is in the order of one hundred and some thousands of an inch between the standard thicknesses, advantage may be taken of the thread formed on the shaft 42 which, as previously set forth, may be the conventional micrometer screw of forty threads per inch. By so turning the shaft as to produce substantially five complete revolutions thereof, this major difference can be readily relieved and the transformer 35 moved to a lowered position so that when the gaging head is placed upon the checking plate, the indicated difference on the dial 61 may only be a few thousands of an inch out, either way, from the zero indication which denotes the standard thickness required.

It is now possible by means of the knob 127 on the cabinet 60 to adjust the setting or position of the pointer 62 in relation to the zero indication 65. By turning the knob 127, the arm 104 of the variable resistance 103 may be shifted until the consequent change in current output from the amplifier 96 causes the motor 119 to sufficiently change the current flow through the variable resistance 107 and the sides of said circuit through coils 56 and 57 to shift the pointer to the midway position on the dial. The lock nut 49 on the shaft is then returned to secure the shaft 42 and the cover 32 of the gaging head properly replaced.

The head 13 is now corrected for indicating the various thicknesses of a thinner sheet of glass with the possible exception that in producing a balance in the bridge circuit between the coils 56 and 57, the correction may have produced a change in the magnitude of current through the variable resistance 107. As previously pointed out, this condition reduces or increases the extent of movement of the pointer 62, visually, so that the measurement of its movement is not equal to a given increase or decrease of glass thickness. The knob 138, operatively connected to the adjusting arm 134 of the variable resistance 132 in parallel with the resistance 107, may now be manipulated to compensate for the differential of voltage so that the variance of glass thickness can be accurately computed. This modification can also be made while the head 13 is on a checking plate 131 since the amount of difference between the plates 128, 129 and 130 thereon has been previously established.

According to this invention, as above set forth, it is now possible to check the thickness of moving sheet material, having non-magnetic characteristics, and to obtain such measurements as may be desired in critical areas heretofore considered impossible, or at least, impractical to reach. While the description of this inspection apparatus has, by way of example, been directed to one application of its advantageous use, it is to be pointed out that there is no stringent requirement that the same is useable only in connection with glass or that the supporting film should or must be of a liquid character. Thus, without any appreciable alteration of the apparatus, the gaging head 13 can be employed to inspect the thickness of materials which at one point or another in their processing are maintained at temperatures well above the boiling point of water, or like liquids which may be substituted therefor in accordance with allied steps of a particular process. Suitable gaseous elements may be equally used to good advantage under some circumstances, the essential point being that the gaging head is supported at a predeterminable height of the surface of the material by a fluid film.

Figure 9:
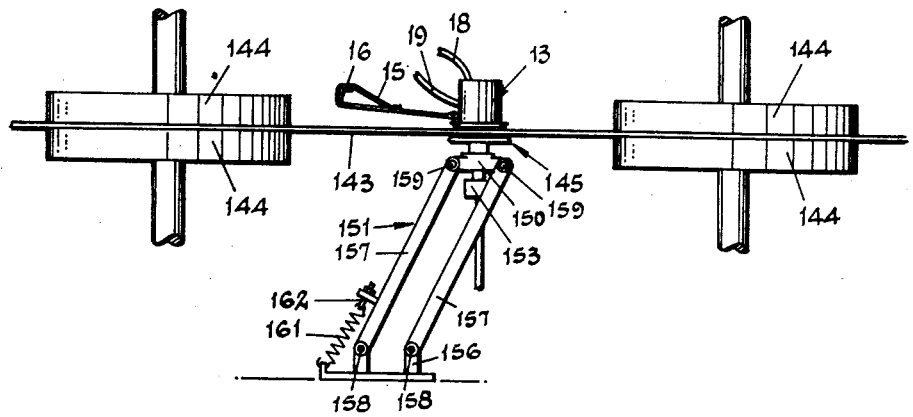
Fig. 9 is a fragmentary side elevational view of a conventional double-grinding system wherein a modified form of inspection apparatus is arranged.
Figure 10:
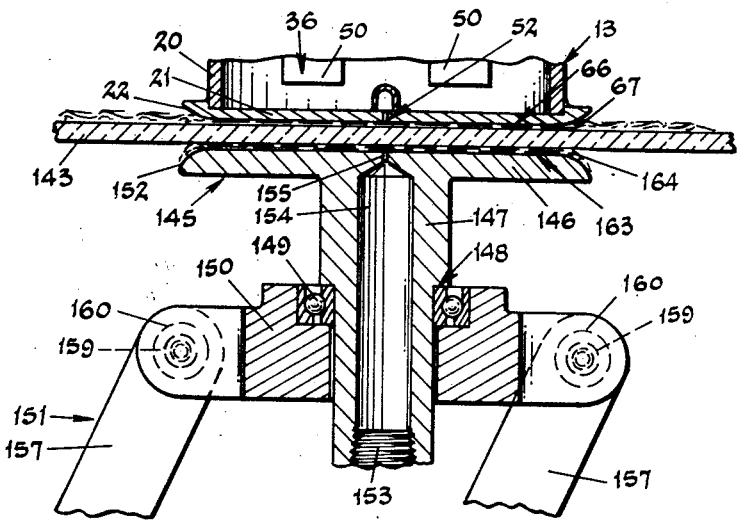
Fig. 10 is an enlarged cross-sectional detail view of the modified form of apparatus.

As a further example of the novel uses to which the inspection apparatus 13 may be put, there is shown in Figs. 9 and 10, an operating procedure for continuously checking the thickness of a ribbon of glass which is being simultaneously ground (and eventually polished) on both of the surfaces thereof. According to this method of operation for producing plate glass, the ribbon of glass, indicated by the numeral 143, moves directly from the usual annealing lehr toward and between the vertically opposed grinding tools 144. These tools are equipped to grind the glass surfaces in a manner similar to that followed in single surfacing. This method is known as "double" or "twin" grinding and no support is afforded for the continuous ribbon of glass other than the grinding tools or interposed rollers. That is to say, as previously described, the glass was considered in the light of individual sheets and these sheets were carried on metallic tables in a bed of plaster of Paris or the like, but when both surfaces are being acted upon, no comparable support is afforded for the continuous glass ribbon.

Now, the gaging head 13 is adapted to be adequately supported on the glass ribbon 143 and is operable in every wise as previously described with the exception that a suitable reference plate is stationarily disposed beneath said ribbon to function in a manner previously assumed by the work table 10. Thus a plate 145 of magnetic material is disposed against the under surface of the glass ribbon and is spaced therefrom by the same means as that employed to support the gaging head 13 on the upper surface.

As herein shown in Fig. 10, the plate 145 is embodied in an annular, flat contacting member 146 having a tubular stem 147 depending therefrom. The stem 147 is preferably provided with a shoulder 148 midway of its length which shoulder is received by a thrust bearing 149 carried in a collar 150. The collar 150 is flexingly supported by means of a parallelogram frame 151 so that the member 146 is instantaneously removable from the vicinity of the glass surface though it is normally urged thereagainst.

The periphery of the contacting member 146 is suitably rounded, as at 152, so that surface defects or other irregularities of the moving glass will not abruptly strike the same and, should the ribbon shatter, the on-coming edge will sufficiently deflect the member until it can ride thereunder and return to its normal spaced position. The contacting member 146 is held in spaced relation, at a predetermined distance, by means of a film of fluid which is released in the central area of the member at a suitably limited pressure of sufficient force to create a constantly definable space. This fluid, which in the instance of glass, may be water, is conveyed by suitable piping to the end of the tubular stem 147. For this purpose, the stem is tapped to receive a conventional swivel pipe connection 153 and the tubular chamber 154 terminates in a small orifice 155 formed centrally in the contacting member 146.

The parallelogram frame 151 is mounted by a suitable bracket 156 on the floor or adjoining framework of the grinding equipment. The frame comprises pairs of legs 157 which are pivotally supported at one end by shafts 158 on the bracket 156. At their upper ends, the pairs of legs 157 carry the collar 150 by means of studs 153 secured in bosses 160 integrally formed on the periphery of the collar. The legs 157 are caused to swing in an upward direction by means of a coil spring 161 which is anchored at one end to the bracket 156 and attached at its opposite end to one of the legs 157 by a bolt 162. By this arrangement, the legs 157, in unison, urge the collar upwardly and thereby direct the upper surface 163 of the member 146 against the undersurface of the glass ribbon 143. However, when this spring pressure is urging the reference plate 145 against the glass, a supply of fluid, such as water at a suitably limited pressure, is directed through the orifice 155 to establish liquid film therebetween. The pressure effected by the spring 161 will thus be somewhat equalized by the existence of the liquid film and the extent of equalization is determined by the desired thickness of film to be maintained.

Preliminary to using the inspection apparatus in connection with a double grinding system, the gaging head 13 and the plate 145 are arranged at substantially the same elevation as that in which the glass ribbon passes through the grinding tools. By introducing a glass plate of standard thickness between the head 13 and the plate 145 and creating their respective liquid films, the indicating device 14 can be adjusted, as previously described. The position of the parallelogram frame may now be ascertained by suitable means so that when positioned in the line of the moving glass, the frame will support the plate 145 at the same spacial distance from the gaging head. This can, of course, be performed in other ways, the essential factor to be determined being that some arbitrary spacing is obtained which may be considered as the standard distance between the head and the plate.

In use, the gaging head 13 is placed upon the upper surface of the glass ribbon 143 and a film of water, such as previously indicated at 67 in Fig. 2, and also in Fig. 10, is created beneath the under surface 66 of the plate 21. The plate 145 is now positioned against the under surface of the glass and a film of water, as indicated at 164 in Fig. 10, is created beneath said surface of the glass and the surface 163 of the plate. Since the thickness of each of these films (67 and 164) may be estimated within close dimensions under certain working conditions, any variation in the distance between the surface 163 of the reference plate 145 and the lower ends 50 of the transformer core 36, within the gaging head, will be produced by a change in glass thickness and cause an unbalanced condition between the coils 56 and 57. Now, as the ribbon of glass 143 progresses from one set to another of the grinding tools 144, the variations of thickness will produce variations within the electrical system, which variations will be indicated on the dial 61 by means of the pointer 62.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

We claim:

1. An apparatus for determining the thickness of a non-magnetic material from one surface thereof, comprising a magnetic surface beneath the non-magnetic material, means including a supporting case positioned above said surface, means supplying a film of fluid beneath the supporting case to maintain the same at a predetermined distance above the non-magnetic material, a normally balanced electrical system, means constituting a part of the electrical system mounted within said supporting case for creating a magnetic field which varies with changes in the distance between said case and said magnetic surface to create an unbalance in the electrical system, means for indicating the changes in the distance between the case and the magnetic surface, and means operable within the electrical system to balance current conditions when a change in said distance occurs.

2. An apparatus for determining the thickness of a non-magnetic material from one surface thereof, comprising a magnetic surface beneath the non-magnetic material, means including a supporting case positioned above said surface, means supplying a film of fluid beneath the supporting case to maintain the same at a predetermined distance above the non-magnetic material, a normally balanced electrical system mounted within said supporting case for creating a magnetic field which varies with changes in the distance between said case and said magnetic surface to create an unbalance in the electrical system, means for indicating changes in the distance between the case and the magnetic surface, and means operable within the electrical system to balance current conditions when a change in said distance occurs.

3. An apparatus for determining the thickness of a glass sheet mounted upon a metallic supporting surface and moving in a substantially horizontal path of travel, comprising a gaging head including a supporting case positioned above said supporting surface, means supplying a film of fluid beneath the supporting case to maintain the same at a predetermined height above the glass sheet, an electrical indicating system, means mounted within the gaging head and constituting a part of the electrical indicating system for creating a constant magnetic field and a variable magnetic field, the magnitude of variable magnetic field being determined by the elevation of the gaging head above the supporting surface whereby an unbalance between the said magnetic fields will cause a response within the indicating system to denote an increase or decrease of glass thickness from a given standard, and means operable within the electrical indicating system to balance current conditions when the glass thickness varies from the given standard.

4. An apparatus for determining the thickness of a sheet of glass from one surface thereof, comprising a metallic surface above which said sheet is supported and carried in a substantially horizontal path of travel, a gaging head including a supporting case positioned above said surface, means supplying a film of fluid beneath the supporting case to maintain the same at a predetermined height above the surface of the glass, an electrical indicating system, magnetic means mounted within the supporting case and constituting a part of the electrical indicating system for creating a variable magnetic field between the gaging head and the metallic surface and a constant magnetic field, said variable magnetic field being responsive to the changes in glass thickness and producing an unbalance within the electrical system, means for obtaining a balance between the magnetic fields according to predetermined standards of glass thickness whereby the unbalance between the said magnetic fields may be computed as a variance in glass thickness from the predetermined standard, and means operable within the electrical indicating system to balance current conditions when the variance in glass thickness occurs.

5. An apparatus for determining the thickness of a sheet of glass from one surface thereof, comprising a metallic table upon which said sheet is supported and carried in a substantially horizontal path of travel, a gaging head including a supporting case positioned above said table, means supplying a film of fluid beneath the supporting case to maintain the same at a predetermined height above the surface of the glass to rise and fall therewith during changes in glass thickness, means for restricting movement of the gaging head to vertical and horizontally lateral motions with reference to the surface of the glass, an electrical indicating system, means mounted within the supporting case and constituting a part of the electrical indicating system for creating a variable magnetic field between the gaging head and the metallic table in comparison to a constant magnetic field, means for obtaining a balance between the variable and constant magnetic fields according to predetermined standards of glass thickness, means operable within the electrical indicating system to balance current conditions when changes in glass thickness occur, and means for varying the mounted relation of the said magnetic means within said supporting case to compensate for changes in the predetermined standards of glass thickness which exceed the operating range of the electrical indicating system.

6. An apparatus for determining the thickness of a glass sheet from one surface thereof, comprising a magnetic surface above which said sheet is carried in a substantially horizontal path of travel, a gaging head comprising a supporting case having a non-magnetic bottom wall, means supplying a film of fluid beneath the supporting case to maintain the same at a predetermined height above the surface of the glass sheet to raise and lower the same therewith during changes of glass thickness, means for restricting movement of the supporting case to vertical and horizontally lateral motions with reference to the surface of the glass, an electrical indicating system, normally balanced magnetic means mounted within said supporting case and constituting a part of the electrical indicating system, said magnetic means including a constant magnetic field and a variable magnetic field, the magnitude of the variable magnetic field changing with the rise and fall of the gaging head to produce an unbalance between the magnetic fields and create a response within the electrical indicating system to visually denote such change of glass thickness, and means operable within the electrical indicating system to balance current conditions.

7. An apparatus for determining the thickness of a glass sheet from one surface thereof, comprising a metallic table upon which said sheet is supported and carried in a substantially horizontal path of travel, a gaging head comprising a supporting case including a closure cover at one end and a non-magnetic plate forming the bottom wall thereof, the bottom wall having an orifice of small diameter centrally formed therein, means supplying a fluid under limited pressure to said orifice and therethrough for supporting the gaging head on a film of fluid at a predetermined height above the surface of the glass, a mounting plate supported above the bottom wall of the supporting case, a stationary member depending from said plate and having a dovetail groove formed in one face thereof, a slide member having engaging surfaces interfitting with the dovetail groove of the stationary member, an electrical indicating system, a transformer secured to said slide member and constituting a part of the electrical indicating system, said transformer including a core, a primary coil, and a divided secondary coil, means obtaining a constant potential through one part of the divided secondary coil and maintaining a magnetic field of known capacity, the second part of the divided secondary coil being positioned to effect a magnetic field of variable potential with the top of the metallic table, means operable within said electrical indicating system for balancing current conditions therein according to the varied potential of one side of said secondary coil and including means for visually indicating a change from the predetermined height of the gaging head above the top of the metallic table during correction of the balance within the electrical indicating system.

8. An apparatus for determining the thickness of a glass sheet from one surface thereof, comprising a metallic table upon which said sheet is supported and carried in a substantially horizontal path of travel, a gaging head comprising a supporting case including a closure cover at one end thereof and a non-magnetic plate forming the bottom wall having an orifice of small diameter centrally formed therein, means supplying a fluid under pressure to said orifice and therethrough for producing a film of fluid beneath the supporting case to support the same at a predetermined height above the surface of the glass sheet, a mounting plate supported above the bottom wall of the supporting case, a stationary member depending from said mounting plate and having a dovetail groove formed in one face thereof, a slide member having correspondingly engaging surfaces interfitting with the dovetail groove of the stationary member, a shaft threadably supported in said mounting plate, one end of said shaft being rotatably received within the slide member, means for securing the shaft from endwise movement relative to the slide member while producing vertical movement of the slide member with reference to the stationary member, an electrical indicating system, a transformer constituting a part thereof, said transformer being secured to the slide member and including a core, a primary coil and a divided secondary coil, a bar secured to one end of the slide member in spaced relation to the transformer core and adapted to effect a magnetic field of substantially constant potential with one portion of the divided secondary thereof, the threaded shaft being rotatable relative to the mounting plate to raise and lower the slide member and transformer carried thereby with reference to the bottom wall of the said supporting case to obtain a preliminary spacing of said transformer from the top of the metallic table whereby a magnetic field from the second portion of the secondary can be completed with said top of the metallic table which varies with the distance between said case and said metallic table to denote the thickness of glass passing therebetween.

9. An apparatus for determining the thickness of a continuous ribbon of glass moving in a substantially horizontal path of travel, a gaging head comprising a supporting case including a closure cover at one end and a non-magnetic plate forming the bottom wall thereof, the bottom wall having an orifice of small diameter centrally formed therein, means supplying a fluid under limited pressure to said orifice and therethrough for supporting the gaging head on a film of fluid at a predetermined height above the surface of the glass, a plate supported above the bottom wall of the supporting case, a stationary member depending from said plate and having a dovetail groove formed in one face thereof, a slide member having engaging surfaces interfitting with the dovetail groove of the stationary member, an annular plate flexingly supported beneath the glass ribbon and including a tubular depending stem, the plate having an orifice of small diameter centrally formed therein, means supplying a fluid under limited pressure to the tubular stem and outwardly through the orifice for sustaining said annular plate at a predetermined distance from the under surface of the glass ribbon and the gaging head, an electrical indicating system, a transformer secured to said slide member and constituting a part of the electrical indicating system, said transformer including a core, a primary coil, and a divided secondary coil, means obtaining a constant potential through one part of the divided secondary and maintaining a magnetic field of known capacity, the second part of the divided secondary coil being positioned to effect a magnetic field of variable potential with the surface of the annular plate, means operable within said electrical indicating system for balancing current conditions therein according to the varied potential of one side of said secondary coil and including means for visually indicating a change from the predetermined distance of the gaging head from the annular plate during correction of the balance within the electrical indicating system, and adjusting means to move the slide member with reference to the stationary member thereby adjusting the position of the transformer to compensate for changes in standards of glass thickness beyond the operating range of the electrical indicating system.

10. An apparatus for determining the thickness of a glass sheet from one surface thereof, comprising a metallic table upon which said sheet is supported and carried in a substantially horizontal path of travel, a gaging head including a supporting case having a closure cover at one end and a non-magnetic plate forming the bottom wall thereof, the bottom wall having an orifice of small diameter centrally formed therein, means supplying a fluid under pressure to said orifice and therethrough for supporting the gaging head on a film of fluid at a predetermined height above the surface of the glass, an electrical indicating system, a transformer carried within the supporting case and constituting a part of the electrical indicating system, said transformer including a core, a primary coil, and a divided secondary coil, means obtaining a constant potential through one part of the divided secondary coil and maintaining a magnetic field of known capacity, the second part of the divided secondary coil being positioned to effect a magnetic field of variable potential with the top of the metallic table, and means operable within said electrical indicating system for balancing current conditions therein according to the varied potential of one side of said secondary coil and including means for visually indicating a change from the predetermined height of the gaging head above the top of the metallic table during correction of the balance within the electrical indicating system.

11. An apparatus for determining the thickness of a glass sheet from one surface thereof, comprising a metallic table upon which said sheet is supported and carried in a substantially horizontal path of travel, a gaging head including a supporting case having a closure cover at one end thereof and a non-magnetic plate forming the bottom wall having an orifice of small diameter centrally formed therein, means supplying a fluid under pressure to said orifice and therethrough for producing a film of fluid beneath the supporting case to support the same at a predetermined height above the surface of the glass sheet, an electrical indicating system, a transformer constituting a part thereof, said transformer carried within the supporting case and including a core, a primary coil and a divided secondary coil, a bar mounted in spaced relation to the transformer core and adapted to effect a magnetic field of substantially constant potential with one portion of the divided secondary thereof, and adjusting means to raise and lower the transformer with reference to the bottom wall of the said supporting case to obtain a prelinimary spacing of said transformer from the top of the metallic table whereby a magnetic field from the second portion of the secondary can be completed with said top of the metallic table which varies with the distance between said case and said metallic table to denote the thickness of glass passing therebetween.

12. An apparatus for determining the thickness of a continuous ribbon of glass moving in a substantially horizontal path of travel, a gaging head including a supporting case having a closure cover at one end and a non-magnetic plate forming the bottom wall thereof, the bottom wall having an orifice of small diameter centrally formed therein, means supplying a fluid under limited pressure to said orifice and therethrough for supporting the gaging head on a film of fluid at a predetermined height above the surface of the glass, an annular plate flexingly supported beneath the glass ribbon and including a tubular depending stem, the plate having an orifice of small diameter centrally formed therein, means supplying a fluid under limited pressure to the tubular stem and outwardly through the orifice for sustaining said annular plate at a predetermined distance from the under surface of the glass ribbon and the gaging head, an electrical indicating system, a transformer carried within the supporting case and constituting a part of the electrical indicating system, said transformer including a core, a primary coil, and a divided secondary coil, means obtaining a constant potential through one part of the divided secondary coil and maintaining a magnetic field of known capacity, the second part of the divided secondary coil being positioned to effect a magnetic field of variable potential with the surface of the annular plate, means operable within said electrical indicating system for balancing current conditions therein according to the varied potential of one side of said secondary coil and including means for visually indicating a change from the predetermined distance of the gaging head from the annular plate during correction of the balance within the electrical indicating system, and adjusting means to raise or lower the position of the transformer to compensate for changes in standards of glass thickness beyond the operating range of the electrical indicating system.

13. An apparatus for determining the thickness of a non-magnetic material from one surface thereof, comprising a horizontally disposed magnetic surface supporting the non-magnetic material, means including a supporting case positioned above said surface, means supplying a film of fluid beneath the supporting case to maintain the same at a predetermined distance above the non-magnetic material, the bottom wall of the supporting case being of a non-magnetic material, a vertical stationary guide member mounted within said case, a slide member carried by said stationary guide member and vertically adjustable thereon, a normally balanced electrical system, means constituting a part of the electrical system mounted upon said slide member for creating a magnetic field which varies with changes in the distance between said case and said magnetic surface to create an unbalance in the electrical system, and means operable within the said electrical system for balancing current conditions therein.

14. An apparatus for determining the thickness of a non-magnetic material from one surface thereof, comprising a horizontally disposed magnetic surface supporting the non-magnetic material, means including a supporting case positioned above said surface, means supplying a film of fluid beneath the supporting case to maintain the same at a predetermined distance above the non-magnetic material, the bottom wall of the supporting case being of a non-magnetic material, a mounting plate supported above the bottom wall of said case, a stationary guide member depending from said plate, a slide member adjustably carried by said stationary guide member, an electrical indicating system, means constituting a part of the electrical system mounted upon said slide member for creating a constant magnetic field and a variable magnetic field, means operable within the electrical indicating system to normally balance the current conditions therein, the magnitude of the variable magnetic field being determined by the elevation of the supporting case above the magnetic surface whereby an unbalance between the said magnetic fields will cause a response within the electrical system to denote an increase or decrease of thickness of the non-magnetic material from a given standard.

15. An apparatus for determining the thickness of a glass sheet mounted upon a metallic supporting surface and moving in a substantially horizontal path of travel, comprising a gaging head including a supporting case positioned above supporting surface, means supplying a film of fluid beneath the supporting case to maintain the same at a predetermined distance above the glass sheet, the bottom wall of the supporting case being of a non-magnetic material, a mounting plate supported above the bottom wall of said case, a stationary guide member depending from said plate, a slide member adjustably carried by said stationary guide member, an electrical indicating system, means constituting a part of the electrical indicating system mounted upon the slide member for creating a constant magnetic field and a variable magnetic field, means operable within the said electrical indicating system to normally balance the current conditions therein at a given standard of glass thickness, the magnitude of the variable magnetic field being determined by the elevation of the gaging head above the metallic supporting surface whereby an unbalance between the said magnetic fields will cause a response within the indicating system to denote an increase or decrease of glass thickness from the given standard.

DONALD W. DUNIPACE.
NORMAN C. NITSCHKE.

References Cited in the file of this patent
UNITED STATES PATENTS

| Number | Name | Date |
| --- | --- | --- |
| 1,845,231 | Browning | Feb. 16, 1932 |
| 1,925,904 | Mayne | Sept. 5, 1933 |
| 1,946,924 | Allen et al. | Feb. 13, 1934 |
| 2,269,152 | Hathaway | Jan. 6, 1942 |
| 2,303,424 | Bendz | Dec. 1, 1942 |
| 2,365,593 | Rights et al. | Dec. 19, 1944 |
| 2,503,720 | Gieseke | Apr. 11, 1950 |
| 2,540,589 | Long | Feb. 6, 1951 |